(12) United States Patent
Osawa et al.

(10) Patent No.: US 6,650,481 B2
(45) Date of Patent: Nov. 18, 2003

(54) LENS SHEET AND PRODUCING METHOD THEREFOR

(75) Inventors: Futoshi Osawa, Tokyo (JP); Kumpei Oda, Tokyo (JP); Takanori Oboshi, Tokyo (JP); Masafumi Hayashi, Tokyo (JP)

(73) Assignee: Dai Nippon Printing Co., Ltd., Tokyo-To (JP)

( * ) Notice: Subject to any disclaimer, the term of this patent is extended or adjusted under 35 U.S.C. 154(b) by 0 days.

(21) Appl. No.: 10/122,679

(22) Filed: Apr. 15, 2002

(65) Prior Publication Data

US 2003/0002159 A1 Jan. 2, 2003

(30) Foreign Application Priority Data

Apr. 18, 2001 (JP) ........................................ 2001-119411

(51) Int. Cl.[7] .............................................. G02B 27/10
(52) U.S. Cl. ........................ 359/619; 359/620; 359/627
(58) Field of Search ................................. 359/619, 620, 359/627, 628, 726; 349/5, 112, 113

(56) References Cited

U.S. PATENT DOCUMENTS

| | | | | |
|---|---|---|---|---|
| 6,075,649 A | * | 6/2000 | Naito | 359/619 |
| 6,157,491 A | * | 12/2000 | Watanabe et al. | 359/619 |
| 6,545,813 B1 | * | 4/2003 | Matthies et al. | 359/619 |
| 2003/0072080 A1 | * | 4/2003 | Ariyoshi et al. | 359/619 |

* cited by examiner

*Primary Examiner*—Georgia Epps
*Assistant Examiner*—M. Hasan
(74) *Attorney, Agent, or Firm*—Timothy J. Keefer; Wildman, Harrold, Allen & Dixon LLP

(57) ABSTRACT

A lens sheet of the present invention comprises: a lens layer having a plurality of unit lenses, each of which is adapted to fully reflect a part of an incident light beam on a fully reflecting portion so as to emit it from a light emitting portion, arranged in a one- or two-dimensional direction on a light emitting side; and reflection attenuating layers for reflecting the light beam incident from an incident light side and attenuating the light beam incident from the light emitting side, the reflection attenuating layers being formed of a material, which can form the layers via a vacuum film forming method, on the fully reflecting portion.

10 Claims, 10 Drawing Sheets

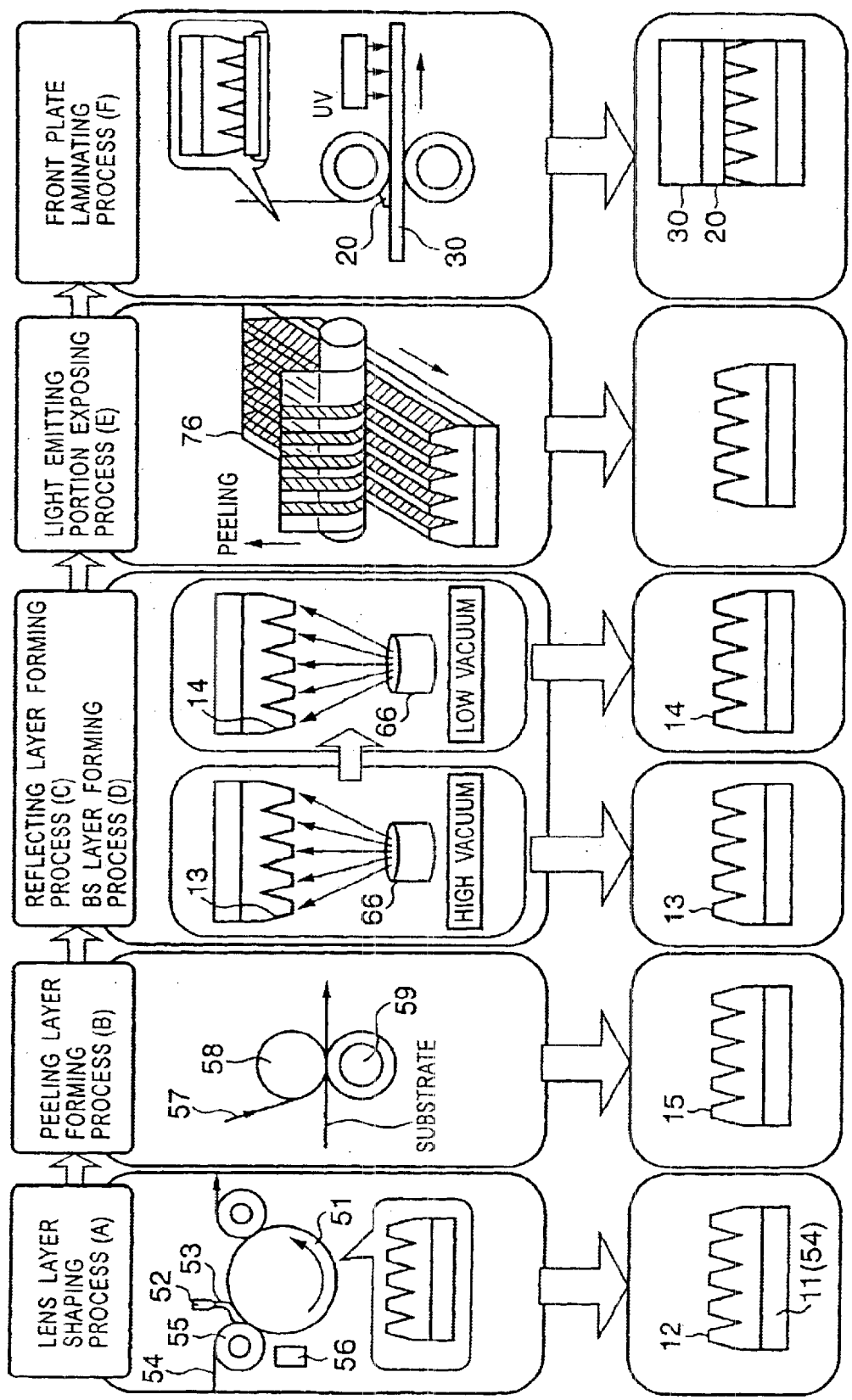

(A) LENS LAYER SHAPING PROCESS (B) PEELING LAYER FORMING PROCESS (C) REFLECTING LAYER FORMING PROCESS (D) BS LAYER FORMING PROCESS (E) LIGHT EMITTING PORTION EXPOSING PROCESS (F) FRONT PLATE LAMINATING PROCESS (C) REFLECTING LAYER FORMING PROCESS (D) BS LAYER FORMING PROCESS (E) LIGHT EMITTING PORTION EXPOSING PROCESS

LENS SHEET AND PRODUCING METHOD THEREFOR

BACKGROUND OF THE INVENTION

1. Field of the Invention

The present invention relates to a lens sheet adaptable to a transparent screen for a single light source projection television or the like using a liquid crystal, a digital light processor (hereinafter abbreviated to "a DLP") or the like, and a producing method therefor.

2. Description of the Related Art

In recent years, a single light source projector of a matrix display using a liquid crystal, a DLP or the like has been found to be more excellent from the viewpoint of brightness, compactness or the like in comparison with a conventional CRT projector, and thus, it has been brought to the commercial stage. Since the matrix display is performed per pixel in the single light source projector, there may arise a problem of a moiré which is generated between a lens pitch of a lenticular lens included in a transparent screen for displaying an image and a pixel pitch of an image to be projected. In order to avoid the moiré, the pitch of the lenticular lens need be as fine as about 0.2 mm or less.

It has been known that a light absorbing layer called as a black stripe or the like is effective as measure for reducing an adverse influence of outside light.

FIGS. 10A and 10B are cross-sectional views showing lenticular lens sheets in the prior art.

FIG. 10A is a view showing a conventional lenticular lens sheet in which a pitch is not made to be fine.

In the case where a light absorbing layer BS1 is formed in a conventional lenticular lens sheet 101 formed into a substantially elliptical shape in cross section, the light absorbing layer BS1 need be formed at a non-light collecting portion at which no retraction light L1 transmits.

FIG. 10B is a view showing the conventional lenticular lens sheet in which a pitch is made to be fine.

In the case where the pitch of the conventional lenticular lens sheet 101 is made to be fine (a pitch P1 is changed to a pitch P2), a focal distance becomes shorter since a unit lens is reduced in size. Consequently, the distance from the unit lens to the non-light collecting portion also becomes shorter, and therefore, a lenticular lens sheet 102 also need be reduced in thickness (a thickness t1 is changed to a thickness t2).

However, when the lenticular lens sheet becomes thinner according to the fineness of the pitch, as described above, there has arisen a problem of the difficulty of molding with high accuracy in producing by extrusion with high productivity, like in the prior art.

Furthermore, it is necessary to align the lenticular lens with the light absorbing layer with high accuracy, and thus, there have arisen problems of an increase in cost of a producing apparatus and deterioration of productivity.

In view of this, Japanese Patent Application Laid-open No. 10-111537 discloses a screen including an outside light absorbing layer in a lens unit of an elliptical lenticular lens as a lenticular lens of a fine pitch without any alignment. In this screen, it is unnecessary to dispose a light absorbing layer in a non-light collecting portion, thereby dispensing with alignment, with an advantage of fabrication of a lenticular lens of a fine pitch with relative ease.

However, since a light absorbing layer is disposed at a portion at which light transmits, there has arisen a problem of deterioration of light utilizing efficiency.

In the meantime, Japanese Patent Application Laid-open No. 2-22932 discloses a lenticular lens having an uneven shape in which the cross-sectional shape of a unit lens is not a substantially elliptical shape which is effective in collecting light and composed of a portion at which an incident light transmits, a portion at which the incident light is fully reflected and a light absorbing layer formed on the portion at which the incident light is fully reflected, and a producing method therefor.

In this screen producing method, a light absorbing layer is formed outside of a concave reflecting layer by a spraying, coating or squeezing method by the use of black ink. However, the use of these methods causes an uneven outward appearance such as coating thickness unevenness or drying unevenness, thereby arising a problem of the difficulty of the fabrication of a screen without any deficient outward appearance.

Moreover, since the methods for forming the reflecting layer and the light absorbing layer are independent of each other, there has arisen a problem of increases in cost of producing apparatuses and cost of fabrication.

SUMMARY OF THE INVENTION

An object of the present invention is to provide a highly accurate lens sheet of a fine pitch with high light utilizing efficiency, and a producing method capable of readily producing the lens sheet in reduced cost.

The above-described problems can be solved by providing a lens sheet as described below. Here, although for the sake of easy understanding, corresponding reference numerals are used for the explanation in preferred embodiments according to the present invention, they are not limited to those.

That is to say, a lens sheet (10 or 40) according to a first aspect of the present invention comprises: a lens layer (12) having a plurality of unit lenses, each of which is adapted to fully reflect a part of an incident light beam on a fully reflecting portion (12a) and then emit it from a light emitting portion (12b), arranged in a one- or two-dimensional direction on a light emitting side; and reflection attenuating layers (13 and 14) for reflecting the light beam incident from an incident light side and attenuating the light beam incident from the light emitting side, the reflection attenuating layers being formed of a material, which can form the layers via a vacuum film forming method, on the fully reflecting portion.

In the lens sheet (10 or 40) of the first aspect, a substrate film layer (11) may be disposed on the incident light side of the lens layer (12).

In the lens sheet (10 or 40), the reflection attenuating layers may be disposed on the fully reflecting portion (12a), and comprises a reflecting layer (13) for reflecting the light beam and a light attenuating layer (14 or 14-2) disposed nearer the light emitting side than the reflecting layer, for absorbing and/or scattering the light beam incident from the light emitting side, so as to attenuate the light beam.

In the lens sheet (10 or 40), the light attenuating layer (14) may be made of a metal oxide film.

In the lens sheet (10 or 40), a base metal mainly forming the metal oxide film for the light attenuating layer (14) may be the same as a material forming the reflecting layer (13).

In the lens sheet (10 or 40), the light attenuating layer (14-2) may be made of carbon.

In the lens sheet (10 or 40), the reflectance of the metal forming the reflecting layer (13) may be 85% or more in a visible region, and the spectral reflectance may be substantially flat.

In the lens sheet (10 or 40), the unit lens may be formed into a substantially trapezoidal shape in cross section, the oblique side of the trapezoid may serve as the fully reflecting portion (12a) and a portion corresponding to the upper base of the trapezoid may serve as the light emitting portion (12b).

In the lens sheet (40), a reinforcing plate (30) transparent to the light may be disposed nearer the light emitting side than the light emitting portion.

In the lens sheet (40), the reinforcing plate may contain a diffusing material for diffusing the light.

According to a second aspect or the present invention, a method for producing the lens sheet (10 or 40) comprises the steps of: (A) shaping the lens layer (12); (C and D) forming the reflection attenuating layers (13 and 14), by a vacuum film forming method, over the entire surface of the lens layer formed in the lens layer shaping process; and (E) removing the reflection attenuating layers formed on the light emitting portion in the reflection attenuating layer forming process, so as to expose the light emitting portion (12b).

In the method described above, the process of the step forming the reflection attenuating layers may comprise the steps of: (C) forming the reflecting layer (13) by a vacuum film forming method after the lens layer shaping process; and (D) forming the light attenuating layer (14) with a metal oxide film, on the reflecting layer formed in the reflecting layer forming process while introducing oxygen in a process similar to the process of the step forming the reflecting layer.

In the method described above, the process of the step shaping the lens layer on a substrate film (54) serving as the substrate film layer (11) may comprise the steps of: press-fitting the substrate film to a shaping die (51) in conformity with the shape of the lens layer via an ionizing radiation curable resin (53); irradiating the press-fitted substrate film with an ionizing radiation, so as to harden the ionizing radiation curable resin; and separating the substrate film from the shaping die, so as to remove the ionizing radiation curable resin hardened in the hardening process from the shaping die.

In the method described above, the process of the step (E) exposing the light emitting portion may comprise the steps of: sticking an adhesive film (76) onto the reflection attenuating layers (13 and 14) formed on the light emitting portion (12b); and peeling the adhesive film, so as to shift the reflection attenuating layers from the light emitting portion toward the adhesive film, thus removing the reflection attenuating layers.

The method described above may further comprise the step of: (B) forming a peeling layer (15) on the light emitting portion prior to the reflection attenuating layer forming processes (C and D).

In the method described above, the peeling layer (15) formed in the peeling layer forming process (B) may contain wax therein.

In the method described above, the processes (A to F) in the each step may be sequentially performed from one end of a lens sheet roll, from which a plurality of lens sheets are cut out.

BRIEF DESCRIPTION OF THE DRAWINGS

FIG. 3 is a chart illustrating the flow of a method for producing the lens sheet 40;

DETAILED DESCRIPTION OF THE PREFERRED EMBODIMENTS

Preferred embodiments according to the present invention will be described in more detail hereinafter in reference to the accompanying drawings.

First Embodiment

Figure 1:
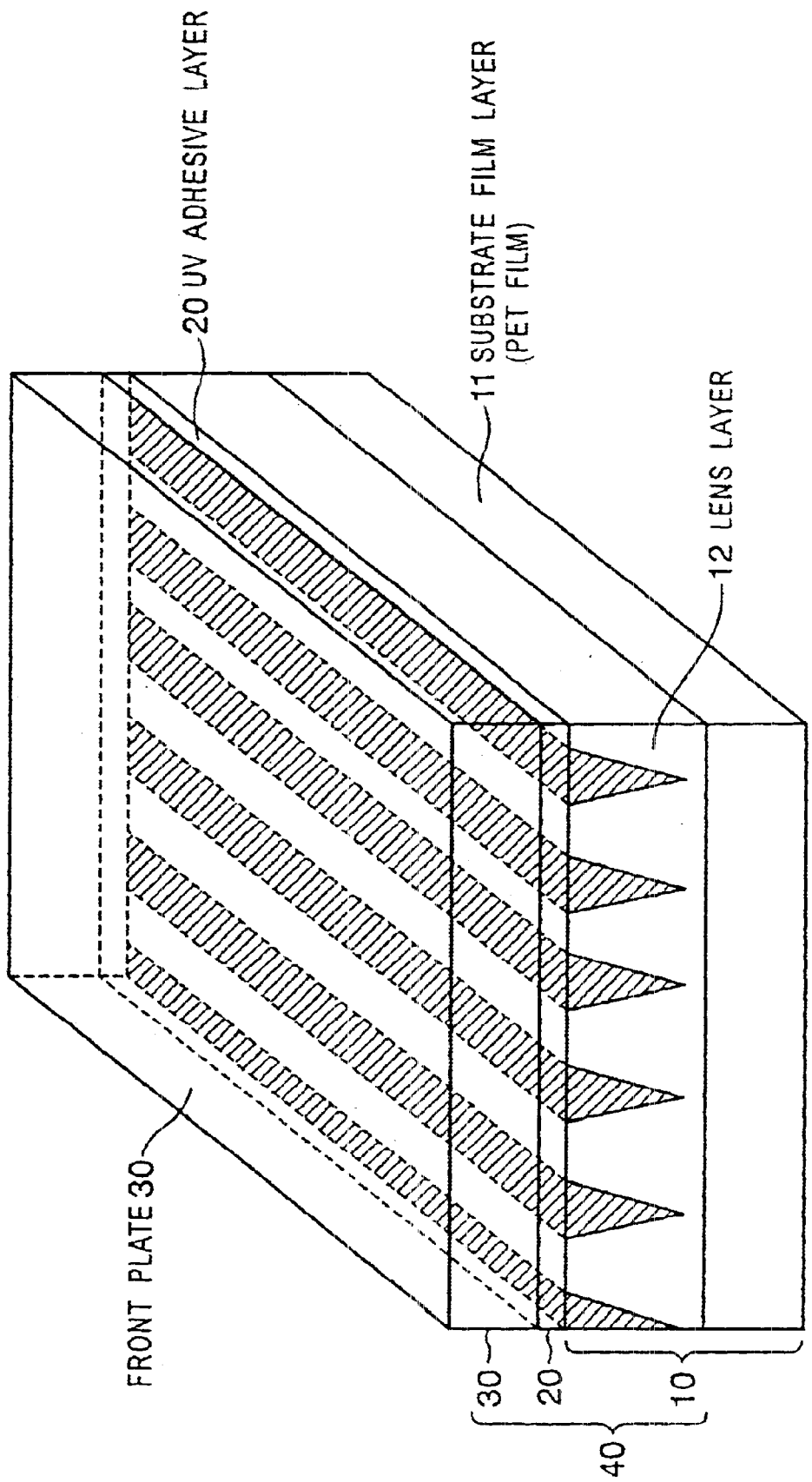
FIG. 1 is a perspective view showing a lens sheet 40 in a preferred embodiment according to the present invention.

FIG. 1 is a perspective view showing a lens sheet 40 in a first preferred embodiment according to the present invention.

The lens sheet 40 is a lens sheet for use in a transparent screen for a single light source projection television by the use of a liquid crystal or a DLP or the like, and is constituted of a lenticular lens sheet 10, an UV adhesive layer 20 and a front plate 30 in lamination.

Figure 2:
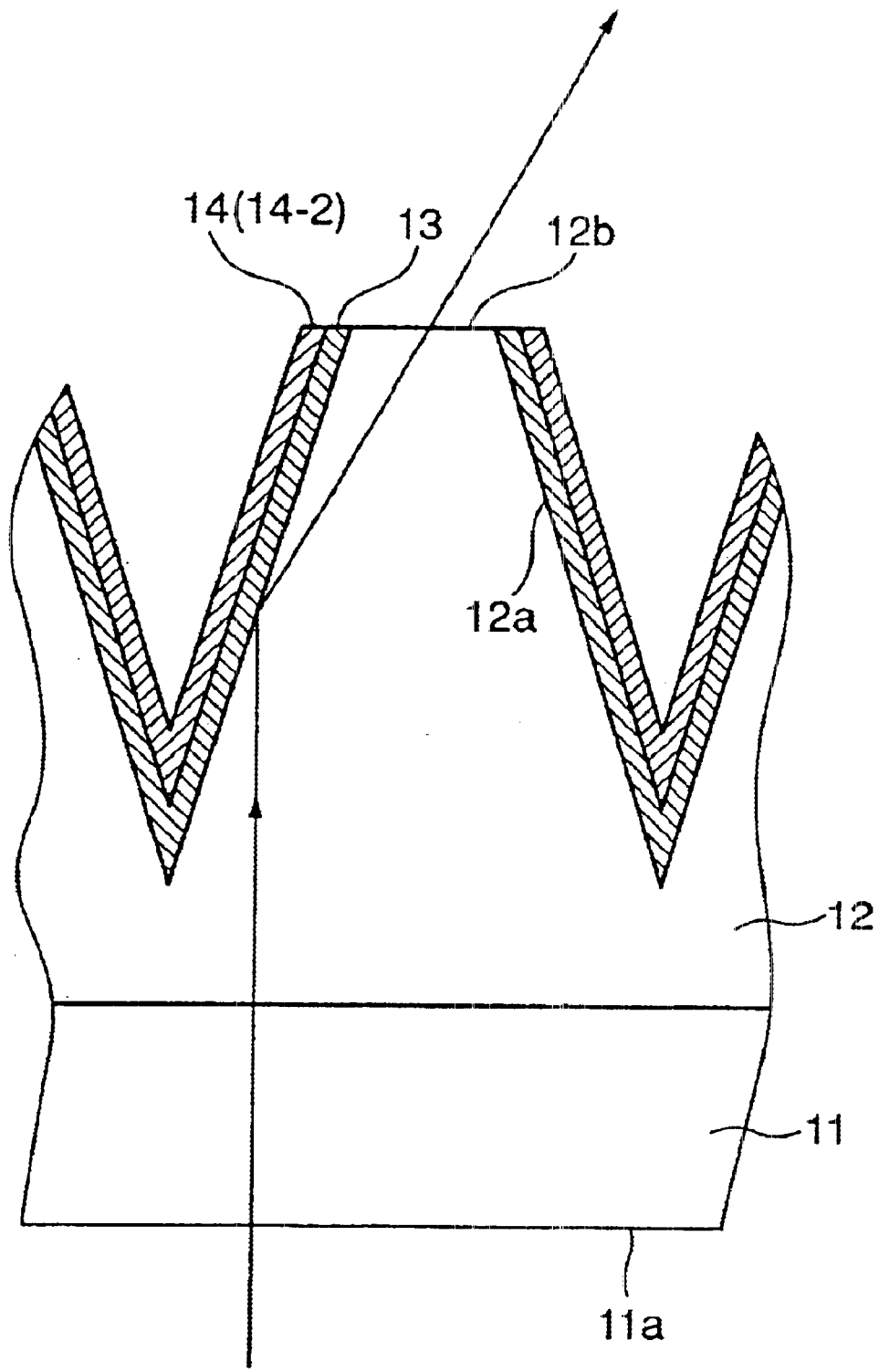
FIG. 2 is an enlarged view showing the cross section of a lenticular lens sheet 10.
Figure 4A:
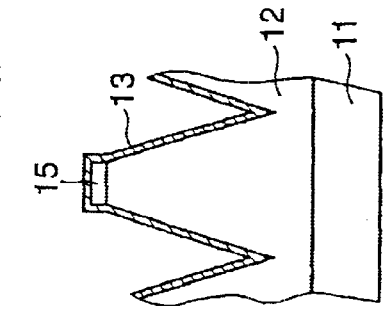
FIGS. 4A to 4F are enlarged views showing the cross section of the lens sheet in processes, respectively.
Figure 4B:
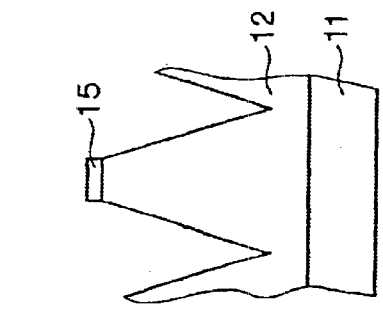
Figure 4C:
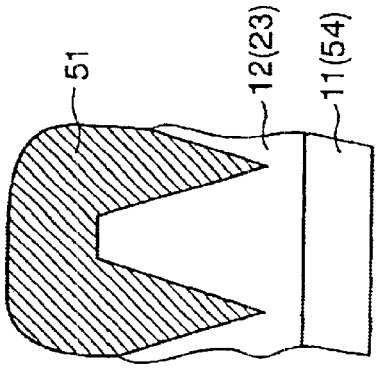
Figure 4D:
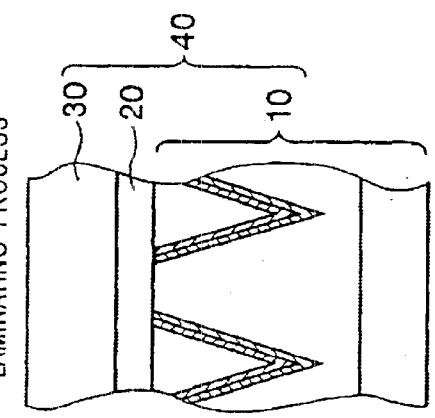
Figure 4E:
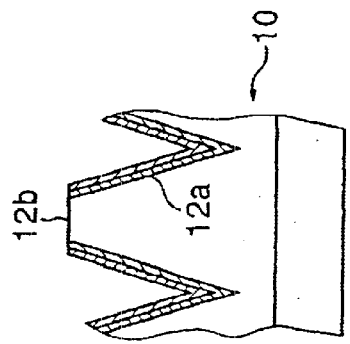
Figure 4F:
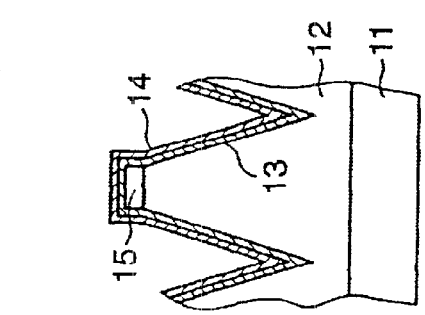

FIG. 2 is an enlarged view showing the cross section of the lenticular lens sheet 10.

The lens sheet 10 in the present embodiment is provided with a substrate film layer (a base film layer) 11, a lens layer 12, a reflecting layer 13 and a black stripe (hereinafter abbreviated as "BS") layer 14

The substrate film layer 11 is a polyester film having a thickness of 188 $\mu$m, and has an incident surface at one surface thereof and the lens layer 12 at the other surface thereof.

The lens layer 12 is a layer having a plurality of substantially trapezoidal unit lenses arranged therein, each of which fully reflects a part of an incident light beam on a fully reflecting portion 12a, and then, emits the light beam from a light emitting portion 12b, wherein the pitch between the unit lenses is set to 96 $\mu$m.

The reflecting layer 13 is a metallic thin film layer formed on the fully reflecting portion 12a. In the present embodiment, a layer of aluminum is formed in a thickness of 0.5 $\mu$m.

The BS layer 14 is formed nearer the light emitting side than the reflecting layer 13, and it serves as a light attenuating layer for attenuating the light beam incident from the light emitting side by absorbing and scattering the light beam. Specifically, a layer of aluminum oxide is formed in a thickness of 0.5 $\mu$m.

The UV adhesive layer 20 is a layer adapted to stick the lens sheet 10 and the front plate 30 to each other, and is made of an ultraviolet curable type adhesive.

The front plate 30 is a substantially transparent plate made of an acrylic resin, an acrylic styrene copolymer resin, a styrene resin, a polycarbonate resin or the like, and is formed in a thickness of about 2 mm to 3 mm.

Since the lens sheet 10 is thinly formed, as described above, over a wide area (used in a size of 70 inch in the present embodiment), it only by itself cannot be held in its own state, which is caused by flexure. Therefore, the front plate 30 is closely stuck to the lens sheet 10 while functioning as a reinforcing plate.

Subsequently, explanation will be made on a method for producing the lens sheet 40 in the present embodiment.

FIG. 3 is a chart illustrating the flow of the method for producing the lens sheet 40.

FIGS. 4A to 4F are enlarged views showing the cross section of the lens sheet in processes, respectively.

The method for producing the lens sheet 40 comprises: (A) a lens layer shaping process; (B) a peeling layer forming process; (C) a reflecting layer forming process; (D) a BS layer forming process (a light attenuating layer forming process); (E) a light emitting portion exposing process; and (F) a front plate laminating process. These processes are performed in sequence, thereby producing the lens sheet 40.

Figure 5:
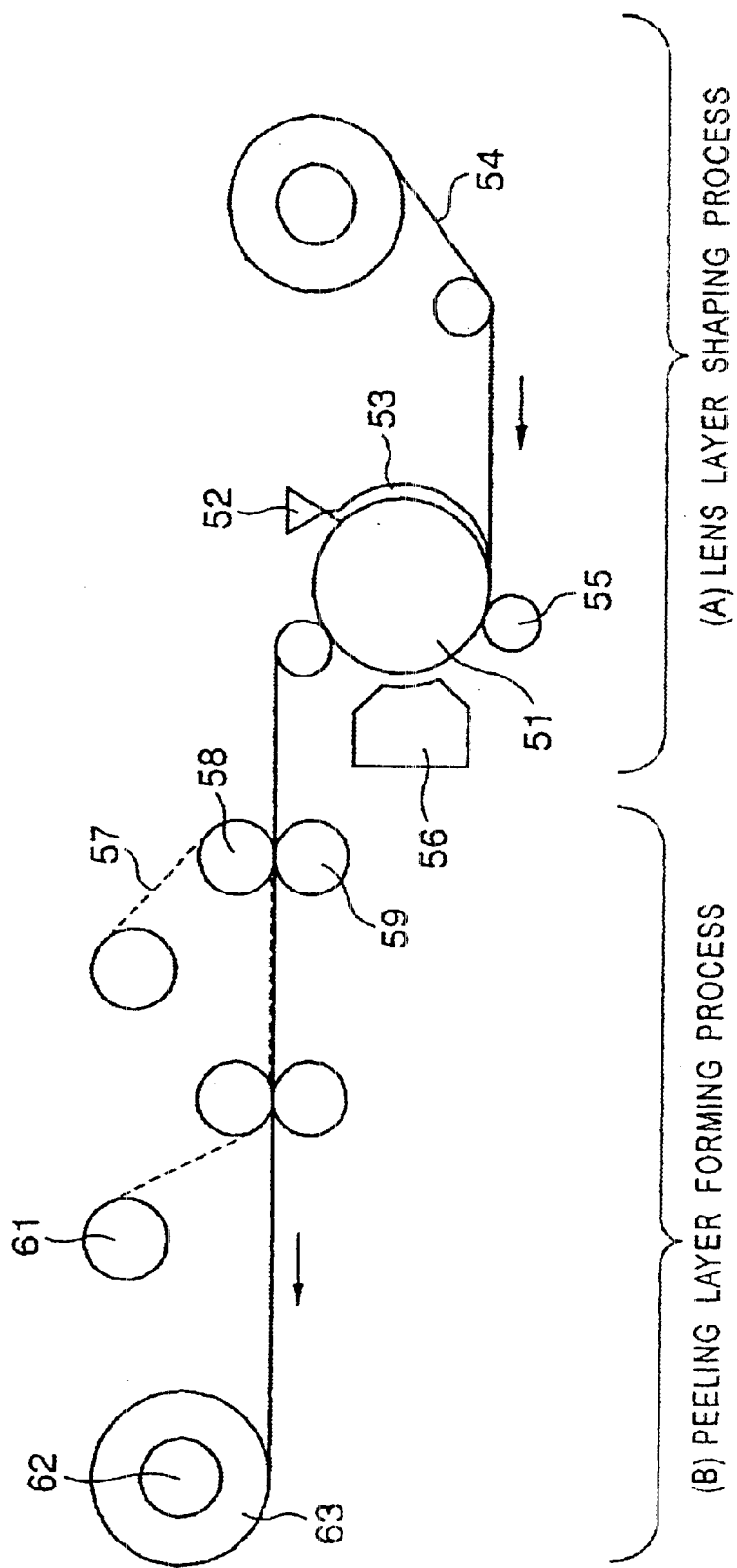
FIG. 5 is a view illustrating a lens layer shaping process and a peeling layer forming process.

FIG. 5 is a view illustrating both of the lens layer shaping process and the peeling layer forming process.

(A: Lens Layer Shaping Process)

First of all, the lens layer 12 is formed on the substrate film layer 11. In this lens layer shaping process, a press-fitting process, a hardening process and a die removing process, as described below, are performed in sequence, thereby forming the lens layer 12.

In the press-fitting process, an ionizing radiation curable resin is applied between a shaping die and a substrate film, and then, the substrate film is press-fitted to the shaping die via the ionizing radiation curable resin by a nipping roll.

Specifically, an acrylic based ultraviolet curable resin 53 as the ionizing radiation curable resin is applied to a shaping roll 51 (having a roll width of 1700 mm) serving as the shaping die having a shape inversing the shape of the lens including the light emitting portion and the fully reflecting portion (wherein the width of the light emitting portion is 50 $\mu$m, the height of the fully reflecting portion is 150 $\mu$m and the pitch is 96 $\mu$m) by a dispenser 52. Thereafter, a polyester film 54 (having a thickness of 188 $\mu$m and a width or 1600 mm) serving as the substrate film to be independently supplied from the upstream is press-fitted to the shaping roll 51 via the acrylic based ultraviolet curable resin 53 by a nipping roll 55 (see FIG. 4A).

In the hardening process, the substrate film press-fitted to the shaping die in the press-fitting process is irradiated with an ionizing radiation, so that the ionizing radiation curable resin is hardened.

In the present embodiment, the substrate film is irradiated with a radiation of 1500 J/cm$^2$ while passing an ultraviolet lamp 56, so that the acrylic based ultraviolet curable resin 53 is hardened.

In the die removing process, the substrate film is removed from the shaping die, so that the ionizing radiation curable resin hardened in the hardening process is removed from the shaping die.

With this process, the lens layer 12 is formed on the substrate film layer 11.

(B: Peeling Layer Forming Process)

Next, it is preferable to perform the peeling layer forming process in which a peeling layer 15 is formed on the light emitting portion 12b before the formation of the reflecting layer 13 in order to readily remove the reflecting layer 13 and the BS layer 14 from the light emitting portion 12b by the adhesive film in the light emitting portion exposing process, which will be performed later.

The peeling layer 15 may be formed with a variety of solvent based inks, which is poor in adhesion to metal forming the reflecting layer 13, by various coating methods such as gravure. It 1s however difficult to coat only the light emitting portion 12b with such a solvent based ink. It is not preferable that the fully reflecting portion 12a also is coated with such a solvent based ink since there is a possibility of simultaneous removal of the reflecting layer 13 and the BS layer 14 formed on the fully reflecting portion 12a in the light emitting portion exposing process, which will be performed later.

In view of this, it is preferable to use a thermal transfer ribbon coated with a peeling layer containing wax in order to selectively form the peeling layer 15 at only the light emitting portion 12b. A thermal transfer ribbon in a solid state Is thermally press-fitted to the light emitting portion 12b, so that a solid material is fused to be shifted to the light emitting portion 12b, thereby forming the peeling layer 15.

The solid material preferably contains mainly wax excellent in transferability at the time of transferring and poor in adhesion to metal. The wax preferably has a melting point of 50° C. to 120° C. (by DSC). For example, although there are listed a paraffin wax, a micro crystalline wax, a carnauba wax, a synthetic wax and the like, it is not limited to the above-described kinds of wax. A thermoplastic resin such as a polyester resin or a rubber based resin may be added, as necessary. A ratio of the wax contained in the peeling layer 15 is preferably 50% or more and, more preferably, 70% or more. The thickness of the peeling layer 15 is preferably 0.01 $\mu$m to 10 $\mu$m and, more preferably, about 0.1 $\mu$m to 5 $\mu$m. In consideration of heat resistance and slidability, a heat resistant layer may be formed at a reverse surface of the peeling layer of the thermal transfer ribbon.

Moreover, a substrate for use in the thermal transfer ribbon is preferably a plastic film such as polyethylene telephtalate in an arbitrarily selectable thickness of about 2 $\mu$m to 100 $\mu$m.

In the present embodiment, a thermal transfer ribbon 57 (having a width of 1500 mm) composed by forming a carnauba wax layer (melting point: 82° C.) in a thickness of 1 $\mu$m on a polyester film having a thickness of 12 $\mu$m is supplied and nipped between a heat roll 58, which is heated up to 100° C., and a nipping roll 59, and then, the carnauba wax material is thermally transferred to the light emitting portion 12b as a projecting tip, thereby obtaining the peeling layer 15. Thereafter, the polyester film as the substrate of the thermal transfer ribbon is peeled off by a taking-up machine 61, and finally, taken up by a lens taking-up machine 62, thus obtaining a lens-shaped molded product (a molded lens) 63 having the peeling layer 15 formed thereon.

(C: Reflecting Layer Forming Process)

This process is to form the reflecting layer 13 made of a highly reflective metal over the entire surface of a lens-shaped portion of the molded lens 63 obtained through the peeling layer forming process by a vacuum film forming method.

Here, any metal forming the reflecting layer 13 may be used as long as the metal has a high reflectance; and therefore, silver or aluminum can be used. It is preferable that the reflectance in a visible region should be 85% or more in consideration of light efficiency, and that the spectral reflectance should be flat in order to prevent any coloration in light of a reflected picture.

Figure 6:
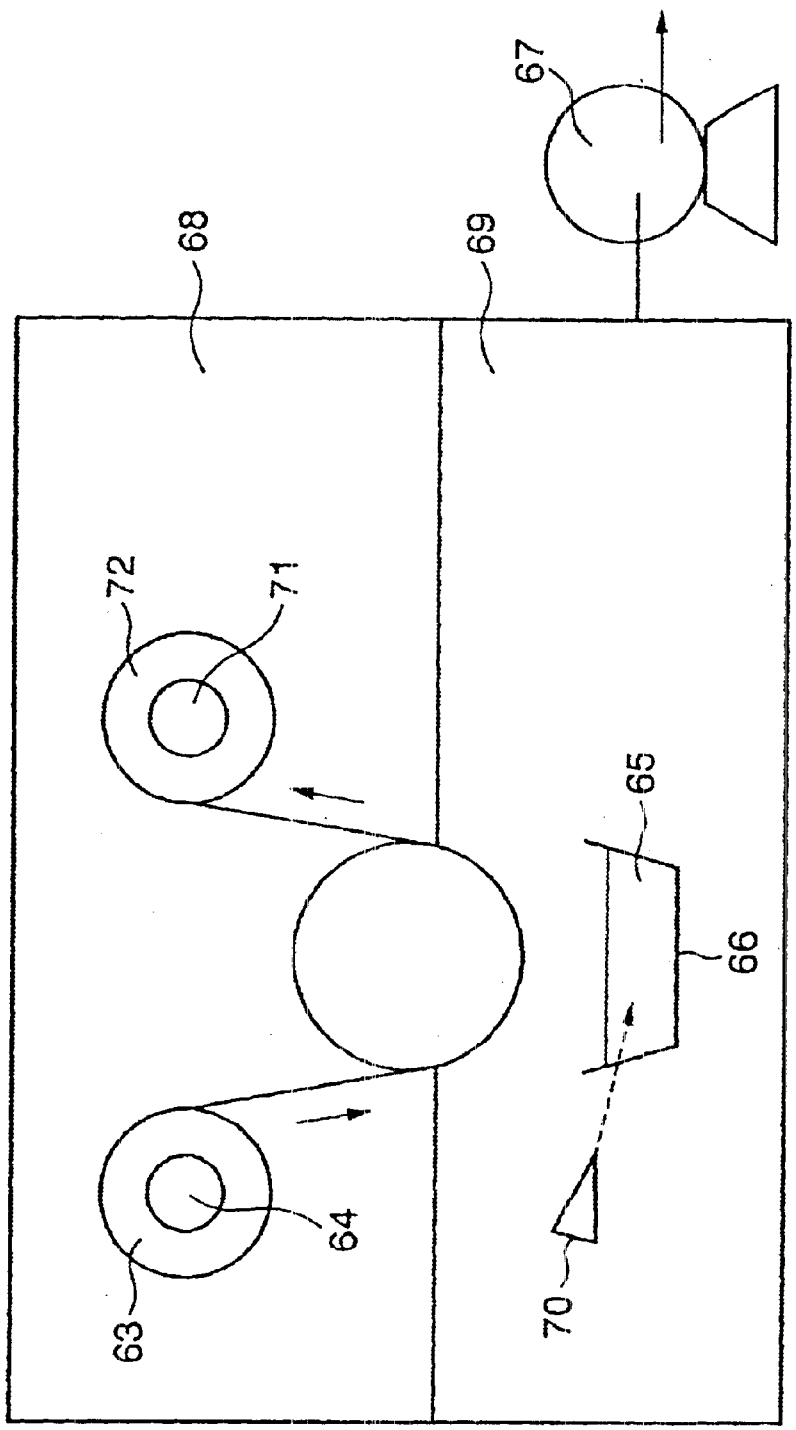
FIG. 6 is a view illustrating a reflecting layer forming process.

FIG. 6 is a view illustrating the reflecting layer forming process.

The molded lens 63 and aluminum 65 are set in a sheet feeder 64 and a deposition source 66, respectively. A vacuum pump 67 sets a taking-up chamber unit 68 to a degree of vacuum of 1×10$^{-3}$ Torr, and further, a deposition chamber unit 69 to a degree of vacuum of 1×10$^{-5}$ Torr, respectively. Thereafter, an electron gun 70 shots an electron beam against the aluminum 65 for evaporation. The reflecting layer 13 made of aluminum is formed on a lens face of the supplied molded lens 63 in a thickness of 0.5 $\mu$m and a width of 1500 mm. And then, a molded lens 72 having the reflecting layer 13 formed thereon is obtained by taking up by means of a taking-up machine 71.

(D: BS Layer Forming Process)

This process is to form the BS layer 14 made of a black material over the entire surface of a lens-shaped portion of the molded lens 72 obtained after the reflecting layer forming process by a vacuum film forming method.

Any material for forming the BS layer 14 can be used as long as it is black and can form a film via a vacuum method. In particular, carbon is preferable since it is excellent in light absorbency. Oxides of the metal forming the reflecting layer 13 can be produced by introducing oxygen in the same process after the formation of the reflecting layer 13, so that they are preferable as the BS layer 14 since they are excellent in productivity and low in material cost.

Figure 7:
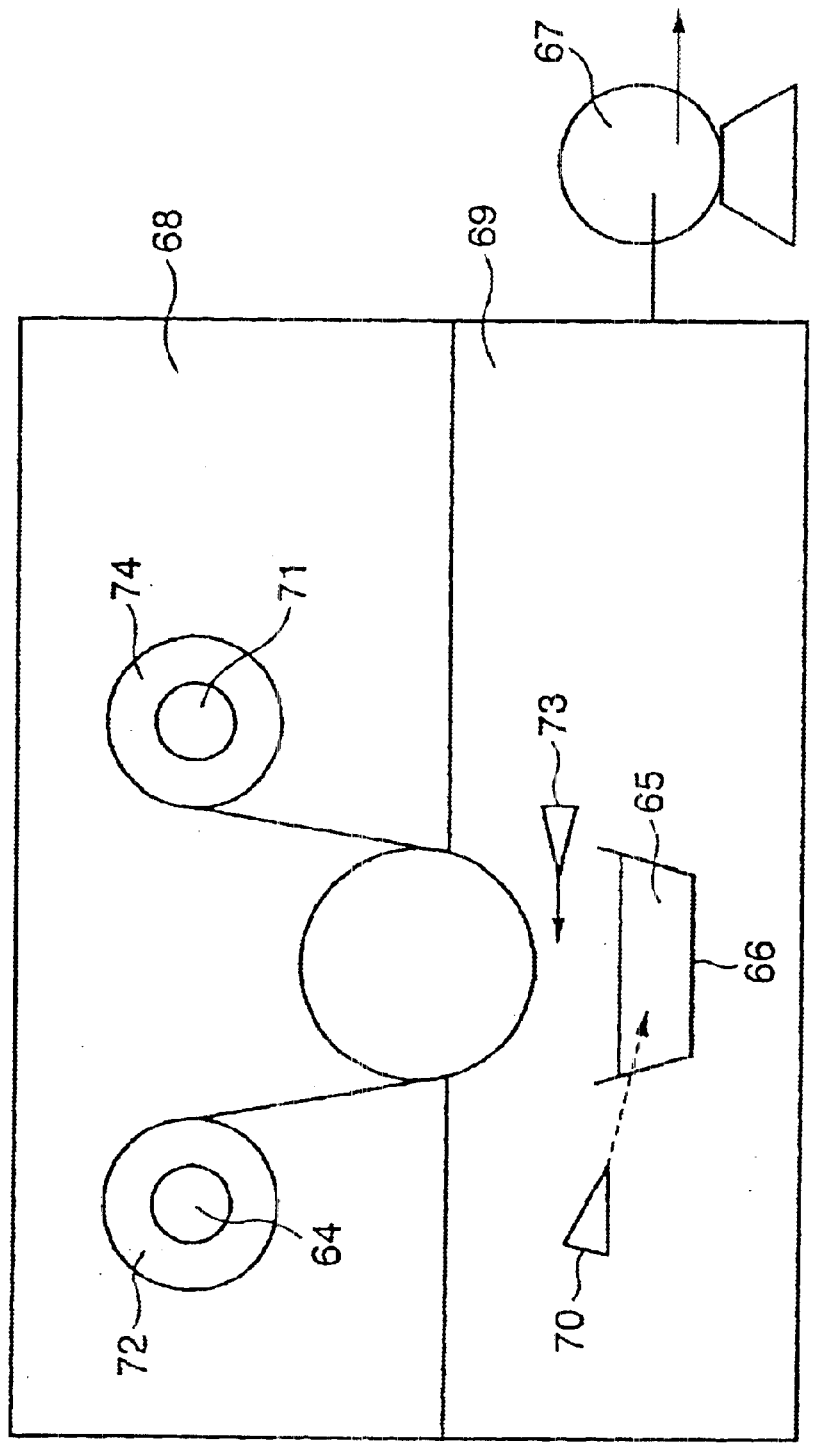
FIG. 7 is a view illustrating a BS layer forming process.

FIG. 7 is a view illustrating the BS layer forming process.

In the present embodiment, after the completion of the reflecting layer forming process, the taken-out molded lens 72 is taken over in a direction reverse to the molding direction to be moved to the sheet feeder 64 while keeping the same degree of vacuum, and then, the aluminum 65 is vaporized by the electron beam. At the same time, oxygen is introduced in 50 cc/min from an oxygen supplying nozzle 73, thereby forming the BS layer 14 made of aluminum oxide in a thickness of 0.5 $\mu$m. Thereafter, it is taken up by the taking-up machine 71, thereby obtaining a molded lens 74 having the BS layer 14 made of aluminum oxide formed on the reflecting layer 13.

Incidentally, the reflecting layer 13 and the BS layer 14 may be formed by the various vacuum film forming methods such as a sputtering method or an ion plate method in addition to the vapor deposition method. A method capable of continuous processing in addition to high productivity is preferable.

(E: Light Emitting Portion Exposing Process)

This process is to peel off the reflecting layer 13 and the BS layer 14 which is formed on the light emitting portion 12b, and comprises an adhesive film sticking process for continuously laminating an adhesive film on the light emitting portion 12b covered with the reflecting layer 13 and the BS layer 14 and a peeling process for shifting the reflecting layer 13 and the BS layer 14 to the adhesive film by peeling the adhesive film, so as to remove them from the light emitting portion 12b.

Figure 8:
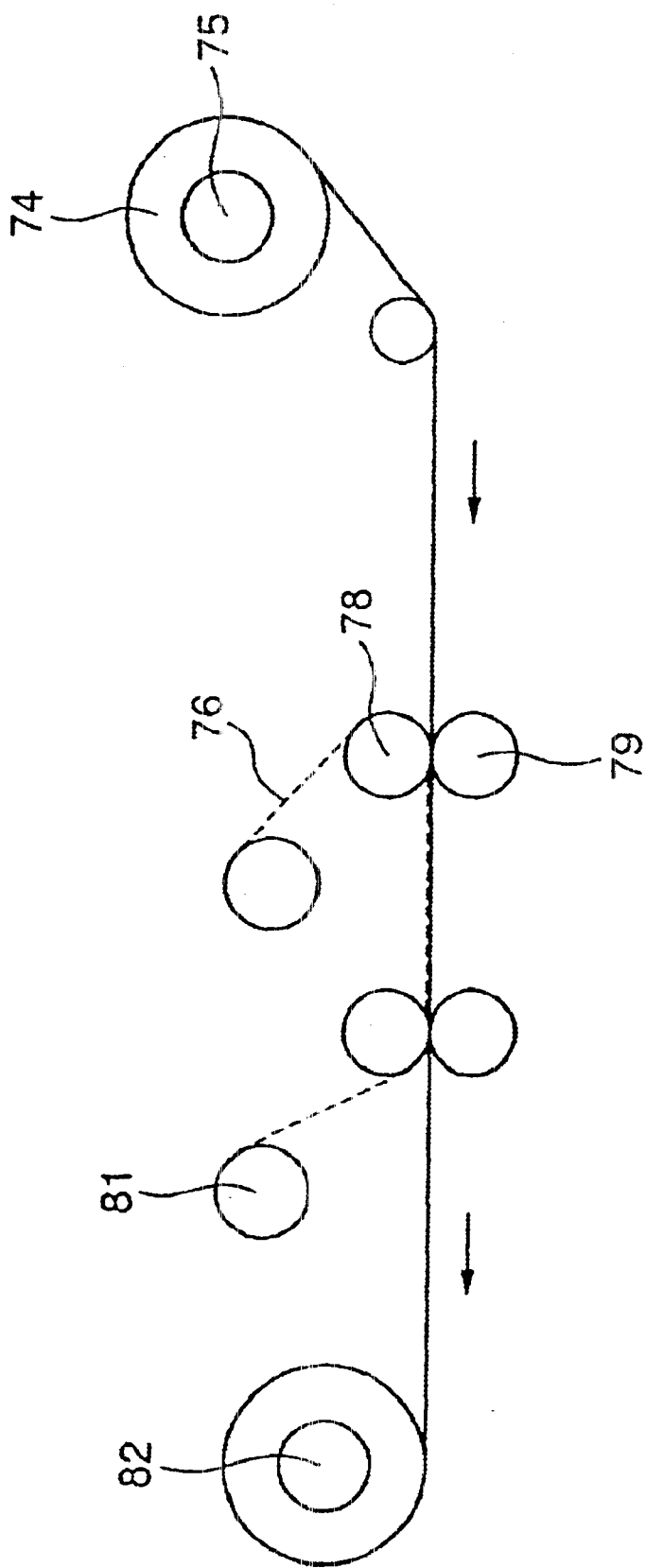
FIG. 8 is a view illustrating a light emitting portion exposing process.

FIG. 8 is a view illustrating the light emitting portion exposing process.

In the adhesive film sticking process in the present embodiment, the molded lens 74, which has been subjected to the vapor deposition, is set in a sheet feeder 75 and supplied. A polyester film 76 in a thickness of 50 $\mu$m having an acrylic adhesive layer in a thickness of 50 $\mu$m is supplied and nipped between a pressurizing roll 78 and a nipping roll 79, to be continuously laminated on the light emitting portion 12b covered with the reflecting layer 13 and the BS layer 14.

Thereafter, the reflecting layer 13 and the BS layer 14 are shifted to the adhesive film by peeling the film by means of an adhesive film taking-up machine 81, and thus, are removed from the light emitting portion 12b (the peeling process).

Here, the apparatus used in the peeling layer forming process may he used as a producing apparatus used in this process.

The above-described processes can provide the lenticular lens 10 including the light emitting portion 12b at which the incident light transmits the lens, the fully reflecting portion 12a having the reflecting layer 13 formed thereon so as to fully reflect the incident light, and the BS layer 14 formed on the fully reflecting portion 12a.

All of these processes are performed in a continuous mode, and therefore, the productivity is high, and further, the reflecting layer 13 and the BS layer 14 can be formed by the use of one and the same vacuum thin film forming equipment, thereby further improving the productivity and reducing the cost of the equipment. Additionally, the BS layer 14 is formed by the vacuum thin film forming method such as the vapor deposition, thus readily controlling the thickness of the layer. Consequently, it is possible to prevent any unevenness of appearance caused by coating unevenness or drying unevenness, which may be found in a coating method.

(F: Front Plate Laminating Process)

The front plate 30 is brought into close contact with the lenticular lens 10, which has been prepared as described above, via the UV adhesive layer 20, and then, is irradiated with an ultraviolet ray, thus completing the lens sheet 40 as shown in FIG. 1.

The completed lens sheet 40 is finally cut off in a size of 70 inch square in a batch cutting-off process, thereby obtaining a lenticular lens screen.

The resultant screen is installed in a transparent projection television, followed by the outside appearance evaluation, resulting in a uniform picture excellent in contrast without any unevenness of the outside appearance.

In the present preferred embodiment, it is possible to readily produce the highly accurate lens sheet of a fine pitch at a reduced cost. In particular, since the BS layer 14 is made of the oxide of the same metal as that of the reflecting layer 13, it is advantageous from the viewpoints of the productivity and the material cost.

Second Embodiment

In a second embodiment, a lens sheet is produced in which a BS layer 14 is made of carbon. Here, the present embodiment is the same in mode and producing method as the first embodiment except that the BS layer 14 is made of carbon, and therefore, common explanation will be omitted hereinafter.

Figure 9:
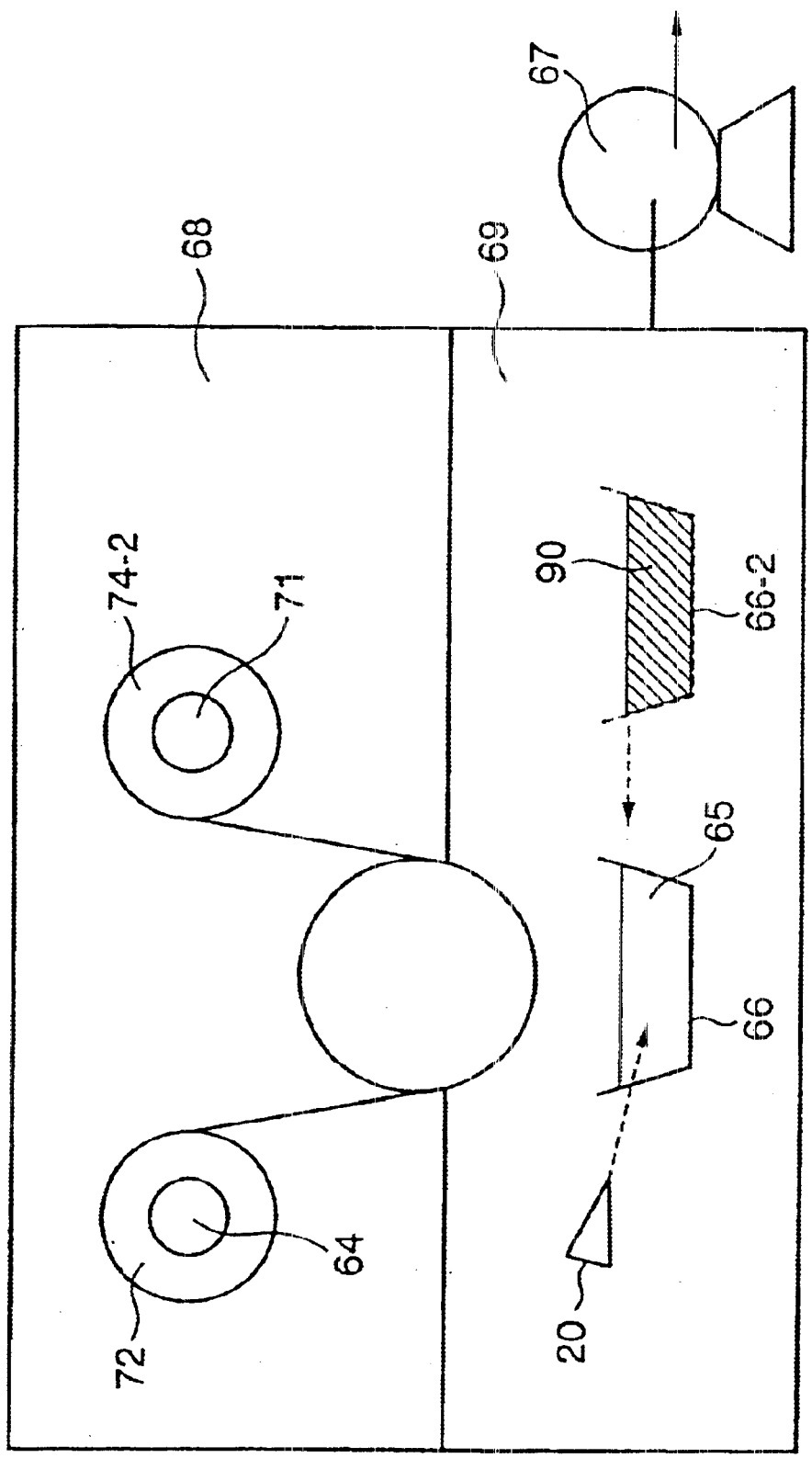
FIG. 9 is a view illustrating a BS layer forming process in a second preferred embodiment.
Figure 10A:
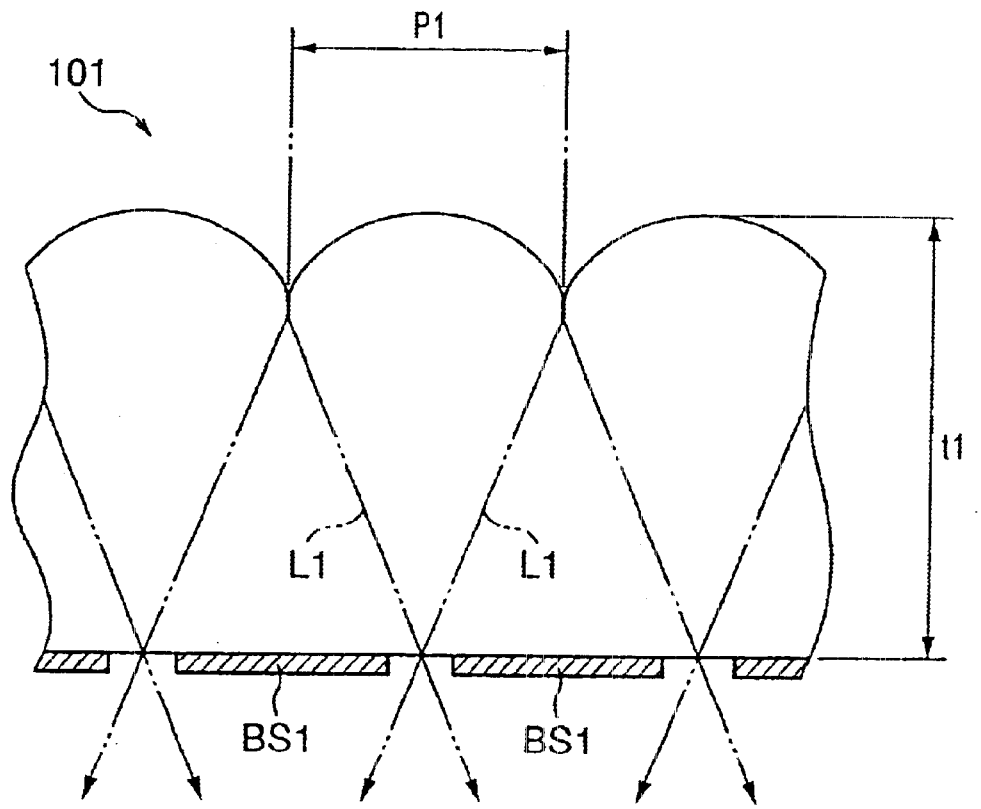
FIGS. 10A and 10B are cross-sectional views showing lenticular lens sheets in the prior art.
Figure 10B:
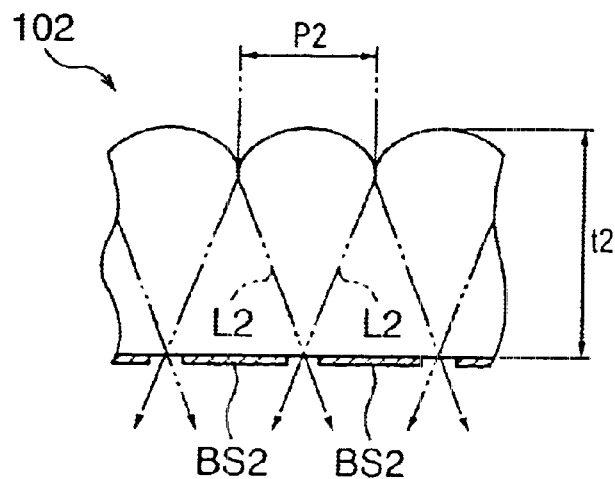

FIG. 9 is a view illustrating a BS layer forming process in a second preferred embodiment.

In the present embodiment, after the completion of a reflecting layer forming process, a taken-out molded lens 72 is taken over in a direction reverse to a molding direction to be moved to a sheet feeder 64 while keeping the same degree of vacuum. Thereafter, in place of a deposition source 66 at which aluminum 65 used in the reflecting layer forming process is set, another deposition source 66-2 at which carbon 90 is set is shifted to a position of the deposition source 66. The carbon 90 set in the deposition source 66-2 is vaporized by an electron beam, thereby forming a BS layer 14-2 made of carbon in a thickness of 0.5 $\mu$m at a lens face of the molded lens 72. And then, the molded lens 72 is taken up by a taking-up machine 71, thus obtaining a molded lens 74-2 having a BS layer 14-2 made of carbon formed on a reflecting layer 13.

Other processes are performed in the sale manner as in the first embodiment, and consequently, a screen is produced.

The resultant screen is installed in a transparent projection television, followed by the outside appearance evaluation, resulting in a uniform picture without any unevenness of the outside appearance and more excellent in contrast than that in the first embodiment.

In the present preferred embodiment, it is possible to improve the quality of a resulting image since the BS layer 14 is made of carbon.

Modifications

It is to be understood that the present invention is not limited to the above-described preferred embodiments, and various modifications and alterations can be added thereto without departing from the scope of the present invention as encompassed by the appended claims.

For example, the front plate 30 may contain a diffusion material therein, thereby further enhancing a diffusion effect.

Alternatively, in place of the reflecting layer 13 and the BS layer 14, there may be provided a single reflection attenuating layer equipped with the effects of these layers 13 and 14.

Otherwise, the reflecting layer and the BS layer may be removed from the light emitting portion 12b in the light emitting portion exposing process not via the adhesive film but by various polishing methods or via an alkaline solution.

As described above in detail, according to the present invention, since the lens layer is formed on the substrate film layer, the light utilizing efficiency is high in spite of the lens sheet of a fine pitch, and further, the lens sheet can be produced with high accuracy.

In addition, the light attenuating layer is made of the metal oxide film, the basic metal of which is the same as that used for the reflecting layer. Consequently, the producing processes can be simplified, and further, the light attenuating layer can provide a picture excellent in contrast.

Moreover, the lens sheet producing method comprises: the lens layer shaping process including the press-fitting process, the hardening process and the die removing process; the peeling layer forming process; the reflection attenuating layer forming process including the reflecting layer forming process and the light attenuating layer forming process; the light emitting portion exposing process including the adhesive film sticking process and the peeling process; and the front plate laminating process. Thus, the method can be achieved in the continuous mode with the high productivity, and further, the reflecting layer and the light attenuating layer can be formed in one and the same equipment, thereby further enhancing the productivity and reducing the equipment cost. Additionally, the light attenuating layer is formed by the vacuum film forming method such as the vapor deposition, thereby readily controlling the thickness of the layer. Thus, it is possible to provide the screen which hardly has the uneven of appearance caused by the coating unevenness, the drying unevenness or the like, which has occurred in the conventional coating method.

What is claimed is:

1. A lens sheet comprising:
   a lens layer having a plurality of unit lenses, each of which is adapted to fully reflect a part of an incident light beam on a fully reflecting portion so as to emit it from a light emitting portion, arranged in a one- or two-dimensional direction on a light emitting side; and
   reflection attenuating layers for reflecting the light beam incident from an incident light side and attenuating the light beam incident from the light emitting side, the reflection attenuating layers being formed of a material, which can form the layers via a vacuum film forming method, on the fully reflecting portion.

2. A lens sheet as claimed in claim 1, wherein a substrate film layer is disposed on the incident light side of the lens layer.

3. A lens sheet as claimed in claim 1, wherein the reflection attenuating layers are disposed on the fully reflecting portion, the reflection attenuating layers comprising:
   a reflecting layer for reflecting the light beam; and
   a light attenuating layer disposed nearer the light emitting side than the reflecting layer, for absorbing and/or scattering the light beam incident from the light emitting side, so as to attenuate the light beam.

4. A lens sheet as claimed in claim 3, wherein the light attenuating layer is made of a metal oxide film.

5. A lens sheet as claimed in claim 4, wherein a base metal of the metal oxide film for the light attenuating layer is the same as a material forming the reflecting layer.

6. A lens sheet as claimed in claim 3, wherein the light attenuating layer is made of carbon.

7. A lens sheet as claimed in claim 3, wherein the reflectance of the metal forming the reflecting layer is 85% or more in a visible region, and the spectral reflectance is substantially flat.

8. A lens sheet as claimed in claim 1, wherein the unit lens is formed into a substantially trapezoidal shape in cross section, a oblique side of the trapezoid serves as the fully reflecting portion and a portion corresponding to the upper base of the trapezoid serves as the light emitting portion.

9. A lens sheet as claimed in claim 1, wherein a reinforcing plate transparent to the light is disposed nearer the light emitting side than the light emitting portion.

10. A lens sheet as claimed in claim 9, wherein the reinforcing plate contains a diffusing material for diffusing the light.

* * * * *